Oct. 18, 1960　　　　IAN MUNRO YULE　　　2,956,450
FLUID DRIVE AND TOOL INCORPORATING SAME
Original Filed March 5, 1957　　　　　　2 Sheets-Sheet 1
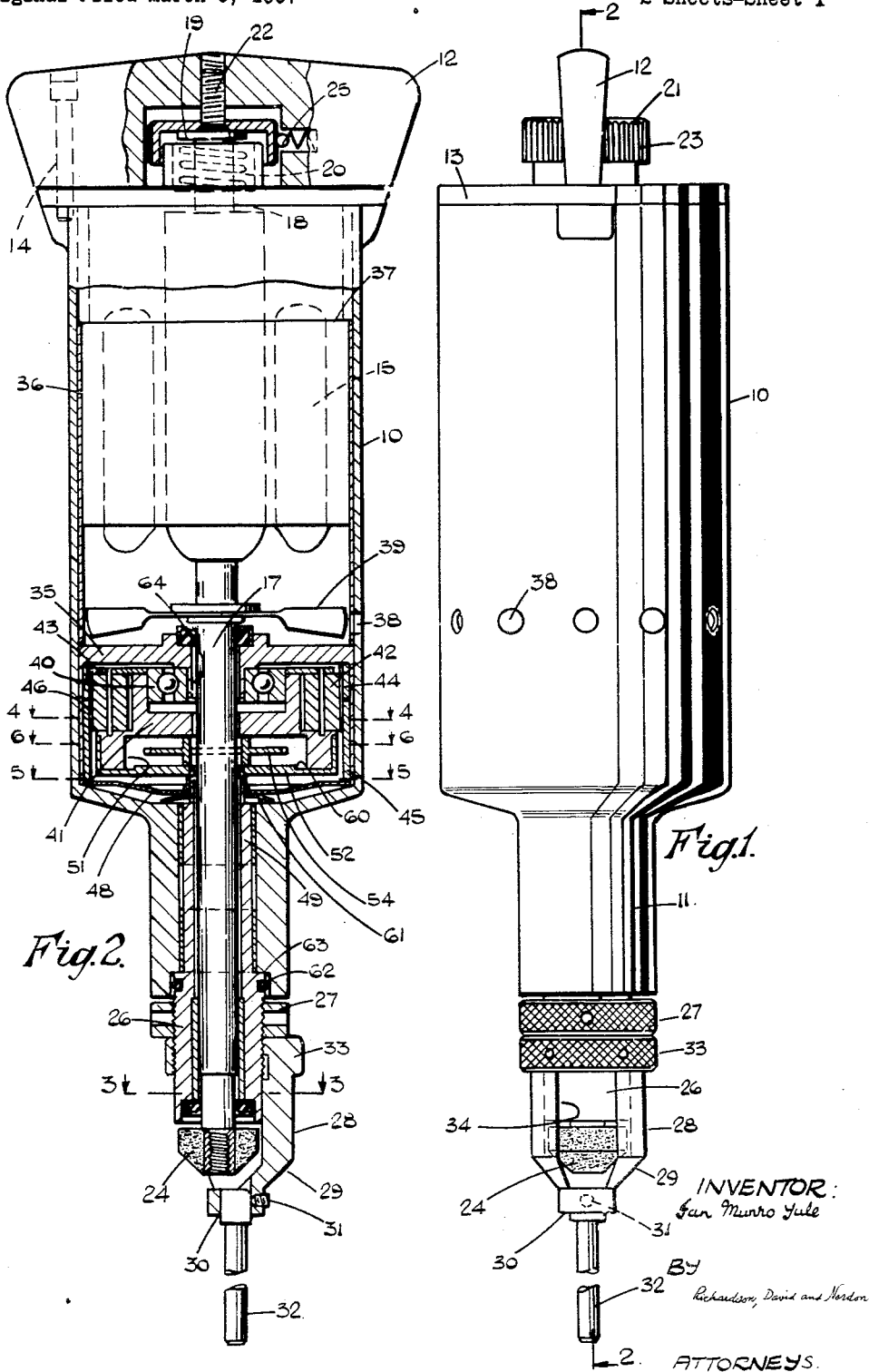

Oct. 18, 1960     IAN MUNRO YULE     2,956,450
FLUID DRIVE AND TOOL INCORPORATING SAME
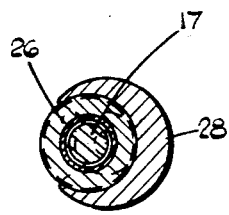
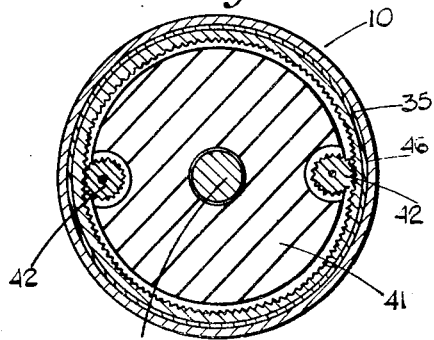
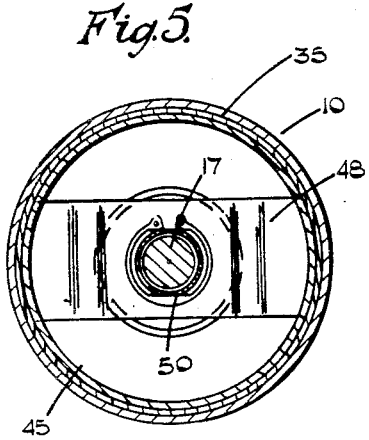
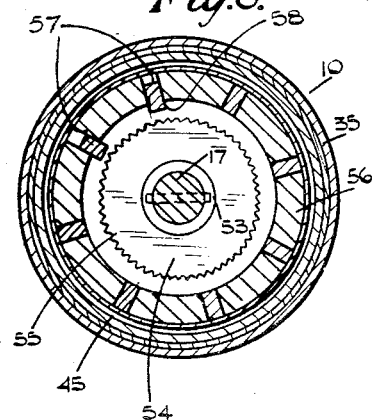
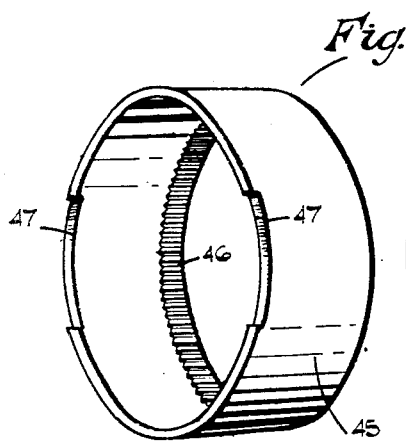
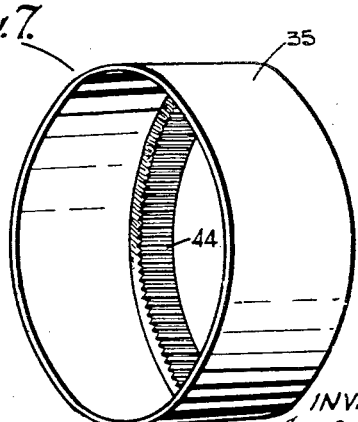

United States Patent Office 2,956,450
Patented Oct. 18, 1960

2,956,450

FLUID DRIVE AND TOOL INCORPORATING SAME

Ian Munro Yule, 145 Yarningale Road, Kings Heath,
Birmingham 14, England

Original application Mar. 5, 1957, Ser. No. 644,034.
Divided and this application Mar. 24, 1959, Ser. No.
801,603

5 Claims. (Cl. 74—730)

This invention relates to a novel form of fluid drive and also to a tool incorporating such fluid drive.

This application is a division of my copending application Serial No. 644,034, filed on March 5, 1957.

One object of the invention is to provide an improved fluid drive having a required degree of speed reduction between the two members (e.g. two shafts), from one to the other of which the fluid drive transmits rotary motion.

Another object of the invention is to provide a fluid drive having an initial high starting torque with uniform speed of rotation during normal running.

A further object of the invention is to provide a compact form of fluid drive for use where space is limited.

A still further object of the invention is to provide a form of fluid drive which will cushion any shocks, and which is also a nonpositive drive.

The invention is illustrated in its various forms in the accompanying drawings which depict a tool for grinding annular valve seats and wherein:

Figure 1 is a side elevation of the tool.

Figure 2 is a section on the line 2—2 in Figure 1.

Figures 3, 4, 5 and 6 are sections on the lines 3—3, 4—4, 5—5, and 6—6 respectively in Figure 2.

Figure 7 is an exploded perspective view showing details of the epicyclic gearing for transmitting rotation to the locating sleeve.

The grinding tool shown in the accompanying drawings has a main outer body portion 10 which is of hollow cylindrical form with a reduced cylindrical portion 11 at the lower end thereof and at the top there is provided a finger grip member 12 having a circular flange by means of which it is secured to the upper end of the body 10 using screws 14.

Within the body 10 there is an electric motor indicated diagrammatically at 15 to the armature of which is secured the grinding wheel shaft 17 extending co-axially within the main body 11.

The upper end of the armature shaft at 18 has at its top a ball thrust bearing 19, below which is arranged a coiled compression spring 20 which serves to urge the armature and grinding wheel shaft 17 upwardly to press the thrust bearing 19 against the underside of an adjustment cap 21, which is secured to the member 12 by means of a screw 22, the periphery 23 of the cap 21 being knurled so that it can be turned easily for the purpose of moving the grinding wheel shaft axially relative to the body 10 so that the grinding wheel 24 which is carried at the lower end of the shaft 17 can be adjusted for degree of cut relative to the valve seat which is being ground.

A spring pressed ball 25 acts as a non-positive lock for retaining the cap 21 in any desired adjusted position.

Projecting endwise from the reduced portion of the body is an externally threaded sleeve 26, this sleeve 26 being rotatable in the reduced portion 11 and the bore of the sleeve 26 is suitably lined to provide a bearing for this end of the shaft 17.

The locating sleeve has a main body portion 28 which is of cylindrical form and a frusto-conical portion 29 which engages the valve seat which is being ground and at the apex of this portion 29, there is a boss 30 within which is detachably secured by grub screw 31, a pilot shaft 32 which is adapted to engage in the guide associated with the valve seat which is being ground.

The locating sleeve is formed at its upper end 33 with an opening of circular form which is eccentrically disposed in relation to the axis of the locating sleeve and pilot shaft 32, this circular opening being internally threaded so that it can be screwed upon the externally threaded sleeve 26, in which position, as will be seen in Figure 2, the axis of the pilot shaft 32 is offset from the axis of the grinding tool shaft 17. The locating sleeve is positioned on the externally threaded sleeve 26 by means of the internally threaded locking collar 27.

The bowed spring washer 61 acts to urge the sleeve 26 upwardly so that the flange 62 is thrust against the shoulder 63 on the interior of the reduced body portion 11. A thrust washer or rotary thrust race may be provided at this position.

The locating sleeve is formed with an opening 34 which extends over the cylindrical portion 28 and the frusto-conical portion 29 and it will be observed that the periphery of the operative surface of the grinding wheel 24 is positioned in this opening 34 so that when the locating sleeve is engaging a valve seat with its frusto-conical portion 29, the operative surface of the grinding wheel is also in engagement with the valve seat. The sleeve 29 locates the grinding wheel axially and in combination with the pilot shaft also locates the grinding wheel in the radial direction.

Hence, when the locating sleeve is driven at a reduced speed from the electric motor 15 through reduction gearing, which is hereinafter described, the axis 17 of the grinding wheel is caused to traverse in a circular path about the axis of the pilot shaft 32, thus traversing the grinding wheel 24 around the valve seat and performing a grinding operation on the eccentric grinding principle.

It will be observed that the grinding wheel, locating sleeve and pilot shaft are also detachable, so as to be capable of being exchanged for corresponding members of different sizes for dealing with various seats of different dimensions.

The grinding wheel shaft 17 is rotated at a speed of about 10,000 r.p.m. and the desired speed of rotational traverse of the locating sleeve is about 20 r.p.m. so that it will be seen that a reduction gearing of 500 to 1 is required and the construction hereinafter described obtains such a reduction gearing which is completely housed within the cylindrical body 10 without causing any enlargement of the diameter of the body.

Referring to Figure 2, the gearing is contained within an inverted cup-shaped housing 35 which is fitted non-rotatably within the outer body 10 and is held in position by a spacer sleeve 36 which extends between the top of the housing 35 and the underside of a shoulder 37 on the casing of the electric motor. Apertures 38 through the body 10 and spacer sleeve 36 are provided to allow air to be drawn in by the motor cooling fan 39.

A roller bearing 40 is fitted upon a downwardly projecting hollow boss 64 formed integrally with the housing and a planet carrier 41 is rotatably mounted about the bearing 40, this planet carrier 41 having mounted thereon two planet pinions 42 which are situated at diametrically opposed positions and held in place by an end plate 43 so as to be capable of free rotation about their axes which are spaced from and parallel to the axis of the shaft 17. (See now Figures 3 to 7).

Non-rotatably fitted within the cup-shaped housing 35 is an annular gear ring 44 with which the pinions 42 are in constant mesh and these pinions are also in mesh with a driven ring 45 having an internal gear ring 46. The gear ring 45 is disposed concentrically within the cup-shaped housing 35 and is freely rotatably therein and on its lower peripheral edge, the ring 45 has two diametrically opposed notches 47.

The notches 47 are engaged by the ends of a driving plate 48 which is disposed in the bottom of the cylindrical body 10 and which is in driving engagement with an extension 49, formed integrally with the sleeve 26. The driving plate 48 has a central circular aperture provided with diametrically opposed flats 50, which engage corresponding flats provided on the reduced upper end of the extension sleeve 49 so that the drive from the driven gearing 45 is transmitted via the driving plate 48 to the extensions 49 and thus to the locating sleeve 28.

The drive from the shaft 17 to the planet carrier 41 is a fluid pressure-drive and for this purpose the underside of the planet carrier 41 is formed with a circular recess 51 which contains a suitable oil, and the open end of this recess is closed by a dished end plate 52. Disposed within the recess 51 and keyed to the shaft 17 by a peg 53 is an impeller 54 in the form of a circular plate with minute teeth or serrations 55 on its periphery. The wall 56 of the planet carrier which surrounds the recess 51 is provided with a number of radially extending slots 57 in which are slidably mounted vanes 58 each such vane being relieved slightly on its side faces, so as to allow oil from the recess 51 to pass to the rear of the vanes 58. A raised shoulder 60 on the end plate 52 limits the extent of inwards travel of the vanes 58.

The operation of the reduction gearing is as follows: When the grinding tool is set up in position with the locating sleeve in a valve seat and the electric motor is started the rotation of the impeller 54 causes circulation of the oil about the recess 51 and the increased pressure set up at the rear of each vane 58 causes these vanes to move inwardly radially but as soon as the vanes project out of their slots 57, they provide flat radial faces which form abutment surfaces for the circulating oil and thus the oil commences to drive the planet carrier 41. As the speed of rotation of the planet carrier 41 increases, centrifugal force acting on the vanes 58 overcomes the pressure acting at the back of each vane and the vanes gradually move outwardly until once more they are completely housed in their slots 57 and from there onwards the planet carrier 41 is driven solely by the viscous drag of the oil upon the inner surface of the recess 51 and it is found to practice that the amount of slip which occurs in this fluid drive is sufficient to give the desired reduction in drive between the impeller 54 and the planet carrier.

The drive from the planet carrier 41 is then a normal epicyclic reduction drive via the planet pinions 42, the fixed annular ring 44 and the driven ring 46.

For example the gearing can be constructed so as to give a reduction in the fluid part of the drive of 5 to 1 (i.e. the slip between impeller 54 and planet carrier 41) and a reduction of 100 to 1 in the epicyclic gearing, thus giving an overall reduction of 500 to 1 which is required to drive the locating sleeve 28.

It will be appreciated that epicyclic gearing to give a reduction of 500 to 1 in itself would involve rings of considerably larger diameter than those for giving a reduction of 100 to 1, and this would mean that the body 10 of the tool would be too large and unwieldy for practical use. However, the provision of the fluid pressure drive and reduction in this drive permits an epicyclic gearing of a reasonable and practical diameter to be used so that the whole reduction gearing can be accommodated within the confines of the cylindrical body 10.

Further, the fluid pressure part of the drive provides the initial high torque which is required for starting a rotation of the sleeve 28, because the vanes 58 all slide inwardly at the commencement of rotation to provide the positive abutment surface which enables the high torque to be transmitted through the fluid drive for the purpose of starting, and during operation the flexibility of the fluid drive enables it to cushion any shocks which might be encountered through the locating sleeve sticking or encountering any uneven surfaces on the valve seat or other obstruction tending to halt the traverse of the locating sleeve.

Suitable oil seals are provided at various positions around the shaft 17 and also the oil in the recess 51 may be used for lubrication purposes by providing oil grooves extending axially through the sleeve 49, 26 and return passage or passages along the shaft 17.

What I claim then is:

1. A fluid drive comprising a rotary driving member in the form of an impeller of generally circular cross section with its peripheral edge portions having outwardly projecting portions, said impeller being rotatably mounted in a housing containing a suitable fluid, and a vane carrier also rotatably mounted within the housing for rotation about the axis of rotation of the impeller and disposed so as to leave a fluid-filled annular gap between the impeller and the vane carrier, said vane carrier having mounted therein a number of radially slidable vanes which are free to move both inwardly into the annular gap under the influence of fluid pressure in said annular gap and outwardly into the confines of said vane carrier under the influence of centrifugal force.

2. A fluid drive according to claim 1 wherein the impeller comprises a flat disc having its periphery formed with serrations or teeth which are small in relation to the diameter of the disc, and wherein the vane carrier comprises an annular ring surrounding the impeller and having a number of equi-angularly spaced radial slots in each of which is slidably mounted a vane, the radial side faces of the vanes being relieved so as to allow fluid to pass from the annular gap to the end faces of the vanes.

3. A fluid drive in accordance with claim 1 in combination with epicyclic reduction gearing wherein the vane carrier is adapted to act also as a planet carrier for the epicyclic gearing, a number of planet pinions being rotatably mounted in the carrier for rotation about axes parallel to the axis of rotation of the carrier, said planet pinion or pinions being in constant mesh with a non-rotatable annulus gear and a rotatable driven annulus gear.

4. A fluid drive comprising a housing containing a suitable fluid, a rotary driving member having outward projections formed on its periphery and rotatably mounted in said housing, a vane carrier also rotatably mounted in said housing, said vane carrier being disposed so as to leave a fluid filled annular gap between it and the rotary driving member, said vane carrier having a number of radial slots contained in a common plane and opening to said gap, a vane slidably mounted in each of said slots, said vanes having relieved faces so that fluid in said gap can flow into the slots behind the vanes, each vane being free to slide inwards and outwards under the effects of centrifugal force and of fluid pressure, drive being transmitted from the rotary driving member to the vane carrier by the fluid and the vanes automatically positioning themselves so as to maintain a constant speed ratio between the rates of rotation of the vane carrier and the rotary driving member.

5. A fluid drive comprising a housing containing a suitable fluid, a rotary driving member having outward projections formed on its periphery and rotatably mounted in said housing, a vane carrier also rotatably mounted in said housing said vane carrier being disposed so as to leave a fluid filled annular gap between it and the rotary driving member, said vane carrier having a number of radial slots contained in a common plane opening to said gap, a vane slidably mounted in each of said slots, said vanes having relieved faces so that fluid in said gap can flow into the slots behind the vanes, each vane being free to slide inwards and outwards under the effects of centrifugal force and of fluid pressure, each vane extending for the length of the vane carrier and being prevented from moving axially within the housing, drive being transmitted from the rotary driving member to the vane carrier by the fluid and the vanes automatically positioning themselves so as to maintain a constant speed ratio between the rates of rotation of the vane carrier and the rotary driving member.

References Cited in the file of this patent

UNITED STATES PATENTS 2,400,186  Armentrout _____ May 14, 1946

FOREIGN PATENTS 505,413  Belgium _____ Sept. 15, 1951